United States Patent
Newman et al.

(10) Patent No.: US 10,981,468 B2
(45) Date of Patent: Apr. 20, 2021

(54) SPLIT BATTERY FOR AUTONOMOUS DRIVING

(71) Applicant: NIO USA, Inc., San Jose, CA (US)

(72) Inventors: Austin L. Newman, San Jose, CA (US); Alexander J. Smith, White Lake, MI (US); Adam H. Ing, Santa Clara, CA (US); Rick Rajaie, Rochester Hills, CA (US)

(73) Assignee: NIO USA, Inc., San Jose, CA (US)

( * ) Notice: Subject to any disclaimer, the term of this patent is extended or adjusted under 35 U.S.C. 154(b) by 176 days.

(21) Appl. No.: 15/701,034

(22) Filed: Sep. 11, 2017

(65) Prior Publication Data

US 2019/0077272 A1    Mar. 14, 2019

(51) Int. Cl.
| H02J 7/00 | (2006.01) |
| H02J 7/14 | (2006.01) |
| B60L 58/19 | (2019.01) |
| B60L 50/60 | (2019.01) |

(52) U.S. Cl.
CPC ............... B60L 58/19 (2019.02); B60L 50/66 (2019.02); H02J 7/0063 (2013.01); H02J 7/0068 (2013.01); *H01M 2220/20* (2013.01); *H02J 7/0027* (2013.01); *H02J 2007/0067* (2013.01)

(58) Field of Classification Search
USPC .................................................. 320/134, 137
See application file for complete search history.

(56) References Cited

U.S. PATENT DOCUMENTS

| 9,037,334 | B1 | 5/2015 | Cole | |
| 9,525,291 | B1* | 12/2016 | Huynh | ................. H02J 7/0029 |
| 2004/0189248 | A1 | 9/2004 | Boskovitch et al. | |
| 2005/0035741 | A1* | 2/2005 | Elder | ................... H01M 10/122 320/116 |
| 2008/0174274 | A1* | 7/2008 | Kosaka | ................. H02J 7/0016 320/117 |
| 2009/0078481 | A1* | 3/2009 | Harris | ...................... B60K 1/04 180/65.1 |
| 2013/0261914 | A1* | 10/2013 | Ingram | ................. B64C 39/024 701/70 |
| 2015/0192973 | A1 | 7/2015 | Hintz et al. | |
| 2015/0280466 | A1* | 10/2015 | Owen | ..................... B60L 58/21 320/107 |
| 2016/0111881 | A1* | 4/2016 | Ide | ......................... B60L 58/20 307/52 |
| 2017/0005371 | A1* | 1/2017 | Chidester | ............ H01M 10/425 |
| 2017/0141598 | A1* | 5/2017 | Desbois-Renaudin | ..................... H02J 7/007184 |
| 2018/0281615 | A1* | 10/2018 | Kinoshita | ............... B60L 58/13 |
| 2019/0126761 | A1* | 5/2019 | Verbridge | ............ H02J 7/0026 |

OTHER PUBLICATIONS

International Search Report and Written Opinion for International (PCT) Patent Application No. PCT/US2018/049826, dated Dec. 27, 2018 8 pages.

* cited by examiner

*Primary Examiner* — Alexis B Pacheco

(74) *Attorney, Agent, or Firm* — Sheridan Ross P.C.

(57) ABSTRACT

Methods and systems are provided for managing multi-battery systems, such as those utilized in an electric vehicle. Multi-battery systems comprise batteries providing power in parallel, thereby making each battery available to the vehicle and avoiding the weight of transporting a backup battery. The methods and systems provided allow for a fault in one battery, in a parallel configuration with at least one other battery, to be detected and managed.

20 Claims, 10 Drawing Sheets

SPLIT BATTERY FOR AUTONOMOUS DRIVING

FIELD

The present disclosure is generally directed to electric vehicle systems, in particular, toward battery systems for autonomous driving vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new, they are generally implemented through a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
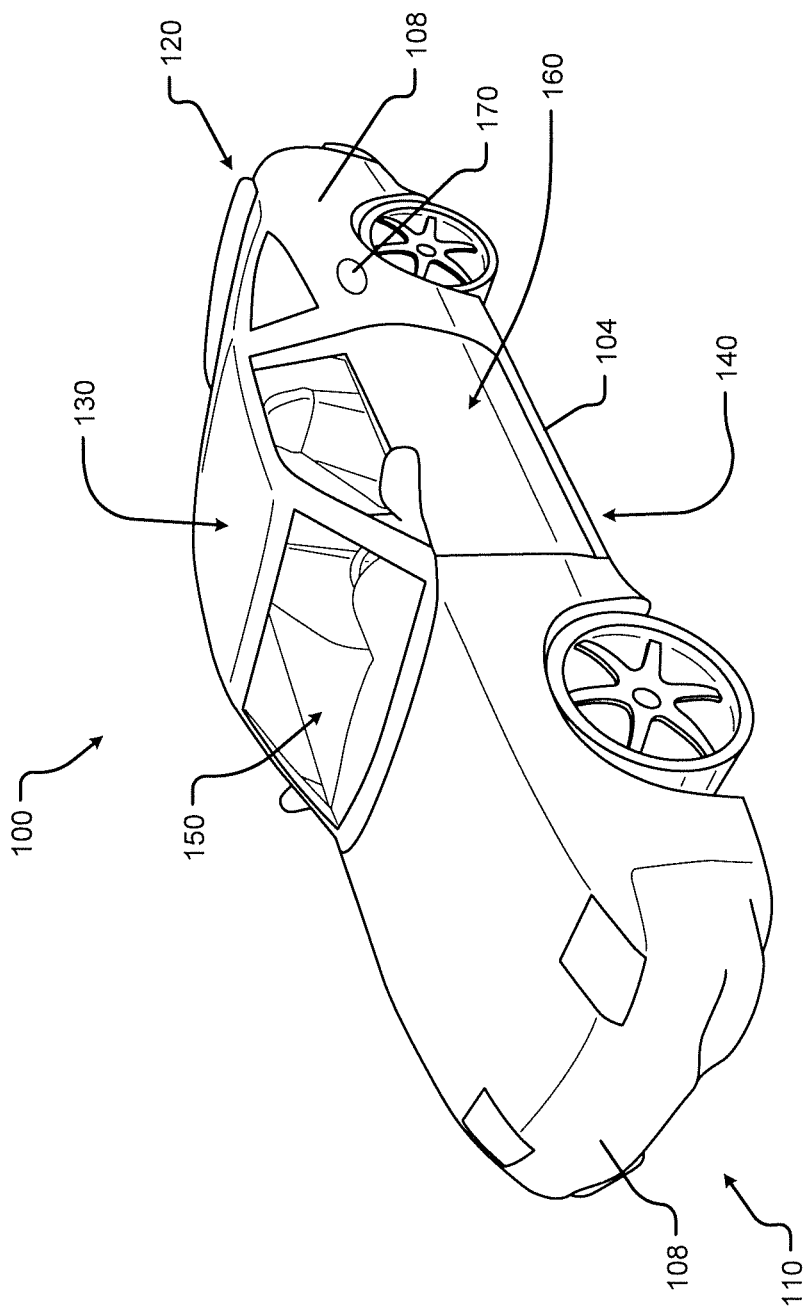
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc. The vehicle 100 may include a plurality of charging ports 170 located on the vehicle front 110, the vehicle aft 120, the vehicle roof 130, the at least one vehicle side 160, the vehicle undercarriage 140, and combinations thereof. Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include, but are in no way limited to, cars, trucks, motorcycles, busses, automobiles, trains, railed conveyances, boats, ships, marine conveyances, submarine conveyances, airplanes, space craft, flying machines, human-powered conveyances, and the like.

Figure 2:
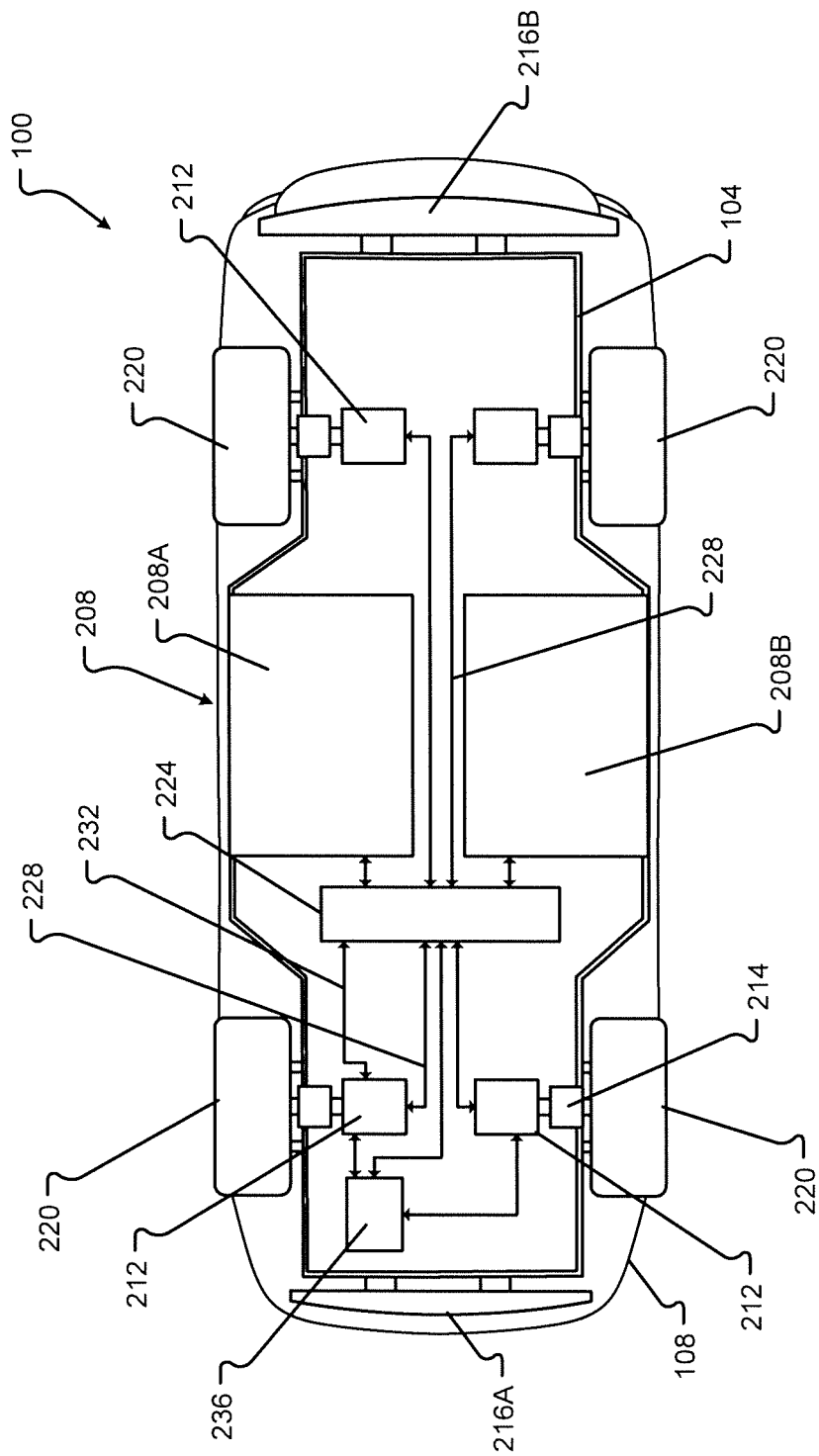
FIG. 2 shows a plan view of the vehicle in accordance with at least some embodiments.

Referring now to FIG. 2, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to, steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, control systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allows the vehicle 100 to adapt to the ever-changing technological demands of society and advances in safety. Among other things, the mechanisms may provide for the quick exchange of batteries, capacitors, power sources 208A, 208B, motors 212, engines, safety equipment, controllers, user interfaces, interior and exterior components, body panels 108, bumpers 216A, 216B, sensors, etc., and/or combinations thereof. Additionally, or alternatively, the mechanisms may provide unique security hardware and/or software embedded therein that, among other things, can prevent fraudulent or low-quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used component of a power source 208A, 208B (e.g., battery unit, capacitor unit, etc.) from the vehicle 100 and replace the used component of the power source 208A, 208B with a charged or new power source. Continuing this example, the power source 208A, 208B may include selectively interchangeable features that interconnect with the frame 104 or other portion of the vehicle 100. For instance, in a power source 208A, 208B replacement, the quick release features may be configured to release the power source 208A, 208B from an engaged position and slide or move in a direction away from the frame 104 of a vehicle 100. Once removed, or separated from, the vehicle 100, the power source 208A, 208B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source 208A, 208B into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208A, 208B. These one or more power sources 208A, 208B may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208A, 208B may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208A, 208B in this manner may provide a number of benefits over conventional vehicle systems. For example, separating the power sources 208A, 208B allows one power source 208, and/or one or more components of the power source 208, to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208A, 208B, or component of power source 208A, 208B is depleted, removed, or becomes otherwise inoperable.

Moreover, by separating the power source 208 into two or more power sources 208A and 208B, each of the power sources 208A and 208B may be charged independently of one another. Thus, power source 208 having a combined 60 kWh capacity for example, may comprise a first power source 208A and a second power source 208B, each having a 30 kWh capacity. The power source 208A and power source 208B are coupled together or otherwise operate in a parallel manner such that the power source 208 is capable of sourcing power at a lower voltage than if the power source 208A and power source 208B were connected in series. In that the power source 208A and power source 208B are separate, each may be charged independently of one another and at the same time. Although each of the power sources 208A and 208B may take longer to charge than charging half a power source with twice the capacity, since power source 208A and 208B can be charged at the same time, an amount of time required to charge both power sources 208A and 208B at the same time is approximately half the time it would take to charge a power source with twice the capacity of an individual power source 208A or 208B. Accordingly, where it may take 40 minutes to charge a power source having a single charge storage element but having twice the capacity of a power source 208A or 208B, it may take 25 minutes to charge power sources 208A and 208B together.

As charging at higher voltages becomes more accessible, an amount of time required to charge the power sources may decrease. For example, it may take half as long to charge a charge storage element using an 800 volt charger than it does using a 400 volt charger. However, charging at higher voltages requires charge storage elements and charging systems capable of supporting the higher voltages. Issues including electrical isolation must be addressed. At least one benefit to having separate power sources includes the ability to utilize separate electrical isolation systems. That is, high voltage systems that may be resident on the vehicle 100 may be mounted to the vehicle body/chassis and therefore, a minimum amount of electrical isolation (resistance) must be maintained between the high voltage system and the body/chassis to ensure a safe vehicle during operation, charging, and/or repair. By using two separate power sources 208A and 208B for example, a lower electrical isolation resistance can be maintained for each power source 208A, 208B while still complying with applicable electrical isolation requirements, where such electrical isolation requirements are based on the amount of leakage current. For example, 49 CFR 571.305 indicates that electrical isolation of a high voltage source in the vehicle means the electrical resistance between the high voltage source and any of the vehicle's electrical chassis divided by the working voltage of the high voltage source. In order to comply with 49 CFR 571.305, the electrical isolation of the high voltage source, determined in accordance with the procedure specified in S7.6, must be greater than or equal to one of the following: (1) 500 ohms/volt for an AC high voltage source; or (2) 500 ohms/volt for a DC high voltage source without electrical isolation monitoring during vehicle operation; or (3) 100 ohms/volt for a DC high voltage source with electrical isolation monitoring, in accordance with the requirements of S5.4, during vehicle operation. In that the electrical isolation expressed in ohms/volt is dependent upon a working voltage of the power source, when the working voltage is double, isolation resistance $R_i$ must be doubled as well, in order to maintain an electrical isolation that complies with the necessary requirements. Although 49 CFR 571.305 is mainly applicable to electrical isolation requirements when the electric vehicle is in operation, similar concepts would be required during charging. That is, during a charging operation, a specific amount of electrical isolation may be required; rather than charging with an increased voltage and therefore an increased amount of electrical isolation, charging multiple power sources, 208A and 208B for example, at a lower voltage may make it easier to comply with required amounts of electrical isolation during a charging operation.

In some embodiments, the power source may be separated into two or more cells, units, sources, and/or systems. By way of example, a vehicle 100 may include a first drive power source 208A and a second drive power source 208B. The first drive power source 208A may be operated independently from or in conjunction with the second drive power source 208B and vice versa. Continuing this example, the first drive power source 208A may be removed from a vehicle while a second drive power source 208B can be maintained in the vehicle 100 to provide drive power. This approach allows the vehicle 100 to significantly reduce weight (e.g., of the first drive power source 208A, etc.) and improve power consumption, even if only for a temporary period of time. In some cases, a vehicle 100 running low on power may automatically determine that pulling over to a rest area, emergency lane, and removing, or "dropping off," at least one power source 208A, 208B may reduce enough weight of the vehicle 100 to allow the vehicle 100 to navigate to the closest power source replacement and/or charging area. In some embodiments, the removed, or "dropped off," power source 208A may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally, or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the charge controller 224 or the power source 208 may include a communication interface. The communication interface may allow the charge controller 224 to report a state of the power source 208 to one or more other controllers of the vehicle 100 or even communicate with a communication device separate and/or apart from the vehicle 100. Additionally, or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 includes one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption of power distribution in the event of a failure.

In some embodiments, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216A, 216B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
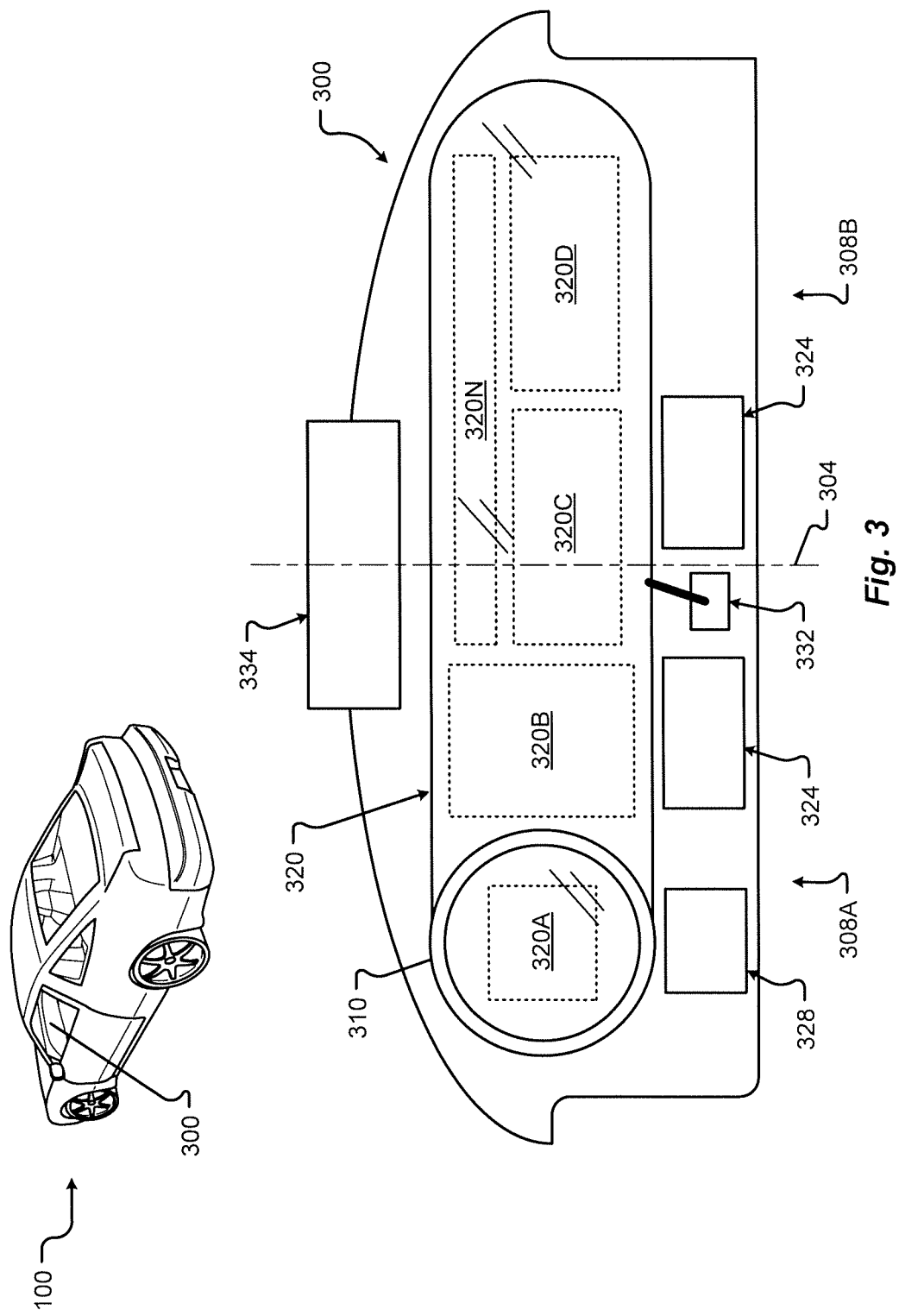
FIG. 3 shows an embodiment of the instrument panel of the vehicle according to one embodiment of the present disclosure.

FIG. 3 shows one embodiment of the instrument panel 300 of the vehicle 100. The instrument panel 300 of vehicle 100 comprises a steering wheel 310, a vehicle operational display 320 (e.g., configured to present and/or display driving data such as speed, measured air resistance, vehicle information, entertainment information, etc.), one or more auxiliary displays 324 (e.g., configured to present and/or display information segregated from the operational display 320, entertainment applications, movies, music, etc.), a heads-up display 334 (e.g., configured to display any information previously described including, but in no way limited to, guidance information such as route to destination, or obstacle warning information to warn of a potential collision, or some or all primary vehicle operational data such as speed, resistance, etc.), a power management display 328 (e.g., configured to display data corresponding to electric power levels of vehicle 100, reserve power, charging status, etc.), and an input device 332 (e.g., a controller, touchscreen, or other interface device configured to interface with one or more displays in the instrument panel or components of the vehicle 100. The input device 332 may be configured as a joystick, mouse, touchpad, tablet, 3D gesture capture device, etc.). In some embodiments, the input device 332 may be used to manually maneuver a portion of the vehicle 100 into a charging position.

While one or more of displays of instrument panel 300 may be touch-screen displays, it should be appreciated that the vehicle operational display may be a display incapable of receiving touch input. For instance, the operational display 320 that spans across an interior space centerline 304 and across both a first zone 308A and a second zone 308B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 300 may be mobile devices and/or applications residing on a mobile device such as a smart phone. Additionally, or alternatively, any of the information described herein may be presented to one or more portions 320A-N of the operational display 320 or other display 324, 328, 334. In one embodiment, one or more displays of the instrument panel 300 may be physically separated or detached from the instrument panel 300. In some cases, a detachable display may remain tethered to the instrument panel. Of course, one or more portions 320A-N of the operational display 320 or other display 324, 328, 334 may include an electrical isolation monitoring system indicator that displays a warning visible to the driver seated in the driver's designated seating position should an electrical isolation fault occur.

The portions 320A-N of the operational display 320 may be dynamically reconfigured and/or resized to suit any display of information as described. Additionally, or alternatively, the number of portions 320A-N used to visually present information via the operational display 320 may be dynamically increased or decreased as required, and are not limited to the configurations shown.

Figure 4:
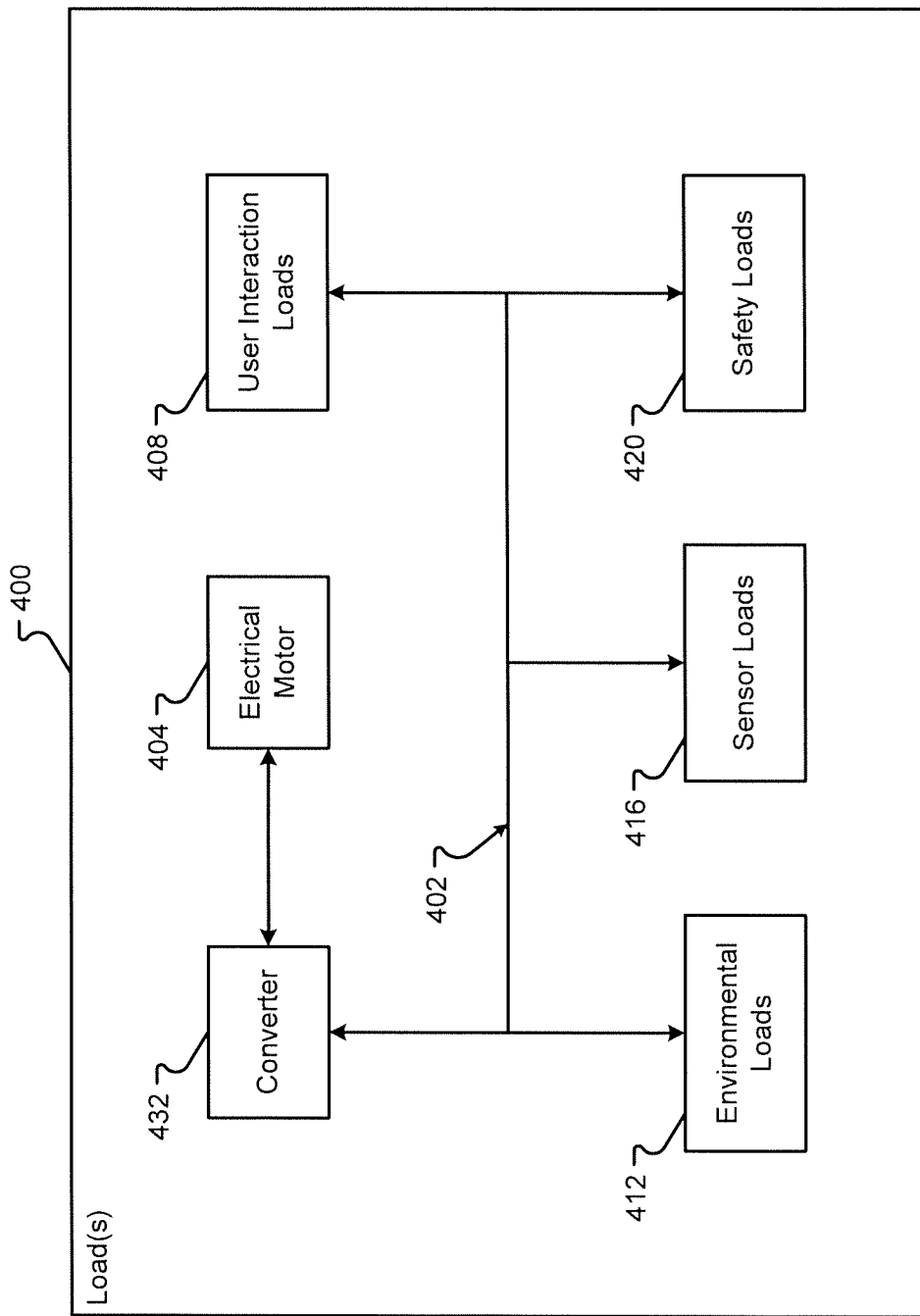
FIG. 4 is a block diagram of an embodiment of a power load system of the vehicle.

An embodiment of one or more loads 400 associated with the vehicle 100 may be as shown in FIG. 4. The loads 400 may include a bus or electrical interconnection system 402, which provides electrical energy to one or more different loads within the vehicle 100. The bus 402 can be any number of wires or interfaces used to connect the power generation unit 404 and/or power storage 208 to the one or more loads 400. The converter 432 may be an interface from the power generation unit 404 or the power storage 208 into the loads 400.

The electric motor 404 can be any type of DC or AC electric motor. The electric motor may be a direct drive or induction motor using permanent magnets and/or winding either on the stator or rotor. The electric motor 404 may also be wireless or include brush contacts. The electric motor 404 may be capable of providing a torque and enough kinetic energy to move the vehicle 100 in traffic. In some embodiments, the electric motor 404 may be similar, if not identical, to the electric motor 212 described in conjunction with FIG. 2.

The different loads 400 may also include environmental loads 412, sensor loads 416, safety loads 420, user interaction loads 408, etc. User interaction loads 408 can be any energy used by user interfaces or systems that interact with the driver and/or passenger(s) of the vehicle 100. These loads 408 may include, for example, the heads up display 334, the dash display 320, 324, 328, the radio, user interfaces on the head unit, lights, radio, and/or other types of loads that provide or receive information from the occupants of the vehicle 100. The environmental loads 412 can be any loads used to control the environment within the vehicle 100. For example, the air conditioning or heating unit of the vehicle 100 can be environmental loads 412. Other environmental loads can include lights, fans, and/or defrosting units, etc. that may control the environment within, and/or outside of, the vehicle 100. The sensor loads 416 can be any loads used by sensors, for example, air bag sensors, GPS, and other such sensors used to either manage or control the vehicle 100 and/or provide information or feedback to the vehicle occupants. The safety loads 420 can include any safety equipment, for example, seat belt alarms, airbags, headlights, blinkers, etc. that may be used to manage the safety of the occupants of the vehicle 100. There may be more or fewer loads than those described herein, although they may not be shown in FIG. 4.

Figure 5:
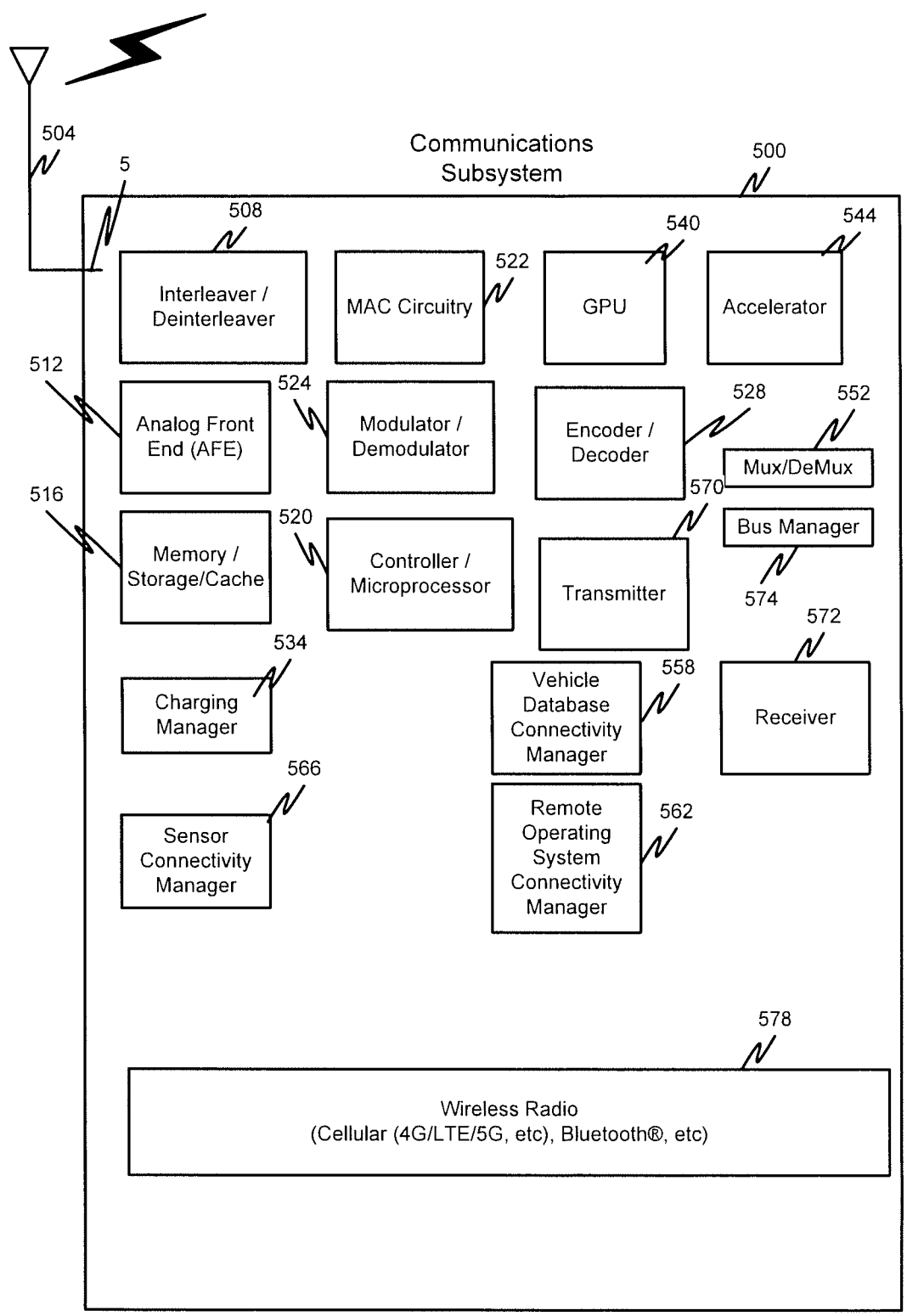
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem enables communications between any if the inter-vehicle systems and subsystems as well as communications with non-collocated resources, such as those reachable over a network such as the Internet.

The communications subsystem 500, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534-566, GPU 540, accelerator 544, a multiplexer/demultiplexer 552, transmitter 570, receiver 572 and wireless radio 578 components such as a Wi-Fi PHY/Bluetooth® module 580, a Wi-Fi/BT MAC module 584, transmitter 588 and receiver 592. The various elements in the device 500 are connected by one or more links/busses 5 (not shown, again for sake of clarity).

The device 400 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 500 can also include a controller/microprocessor 520 and a memory/storage/cache 516. The subsystem 500 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long-term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 500. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 500 can further include a transmitter 570 and receiver 572 which can transmit and receive signals, respectively, to and from other devices, subsystems and/or other destinations using the one or more antennas 504 and/or links/busses. Included in the subsystem 500 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 500 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 500 also includes a GPU 540, an accelerator 544, a Wi-Fi/BT/BLE PHY module 580 and a Wi-Fi/BT/BLE MAC module 584 and wireless transmitter 588 and receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534-566 (even) manage and/or coordinate communications between the subsystem 500 and one or more of the systems disclosed herein and one or more other devices/systems. The connectivity managers include an emergency charging connectivity manager 534, an aerial charging connectivity manager 538, a roadway charging connectivity manager 542, an overhead charging connectivity manager 546, a robotic charging connectivity manager 550, a static charging connectivity manager 554, a vehicle database connectivity manager 558, a remote operating system connectivity manager 562 and a sensor connectivity manager 566.

The emergency charging connectivity manager 534 can coordinate not only the physical connectivity between the vehicle 100 and the emergency charging device/vehicle, but can also communicate with one or more of the power management controller, one or more third parties and optionally a billing system(s). As an example, the vehicle 100 can establish communications with the emergency charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the emergency charging connectivity manager 534 can also communicate information, such as billing information to the emergency charging vehicle and/or a third party. This billing information could be, for example, the owner of the vehicle, the driver/occupant(s) of the vehicle, company information, or in general any information usable to charge the appropriate entity for the power received.

The aerial charging connectivity manager 538 can coordinate not only the physical connectivity between the vehicle 100 and the aerial charging device/vehicle, but can also communicate with one or more of the power management controller, one or more third parties and optionally a billing system(s). As an example, the vehicle 100 can establish communications with the aerial charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the aerial charging connectivity manager 538 can similarly communicate information, such as billing information to the aerial charging vehicle and/or a third party. This billing information could be, for example, the owner of the vehicle 100, the driver/occupant(s) of the vehicle 100, company information, or in general any information usable to charge the appropriate entity for the power received etc., as discussed.

The roadway charging connectivity manager 542 and overhead charging connectivity manager 546 can coordinate not only the physical connectivity between the vehicle 100 and the charging device/system, but can also communicate with one or more of the power management controller, one or more third parties and optionally a billing system(s). As one example, the vehicle 100 can request a charge from the charging system when, for example, the vehicle 100 needs or is predicted to need power. As an example, the vehicle 100 can establish communications with the charging device/vehicle to one or more of coordinate interconnectivity between the two for charging and share information for billing. Once charging is complete, the amount of charge provided can be tracked and optionally forwarded to, for example, a third party for billing. This billing information could be, for example, the owner of the vehicle 100, the driver/occupant(s) of the vehicle 100, company information, or in general any information usable to charge the appropriate entity for the power received etc., as discussed. The person responsible for paying for the charge could also receive a copy of the billing information as is customary. The robotic charging connectivity manager 550 and static charging connectivity manager 554 can operate in a similar manner to that described herein.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 6:
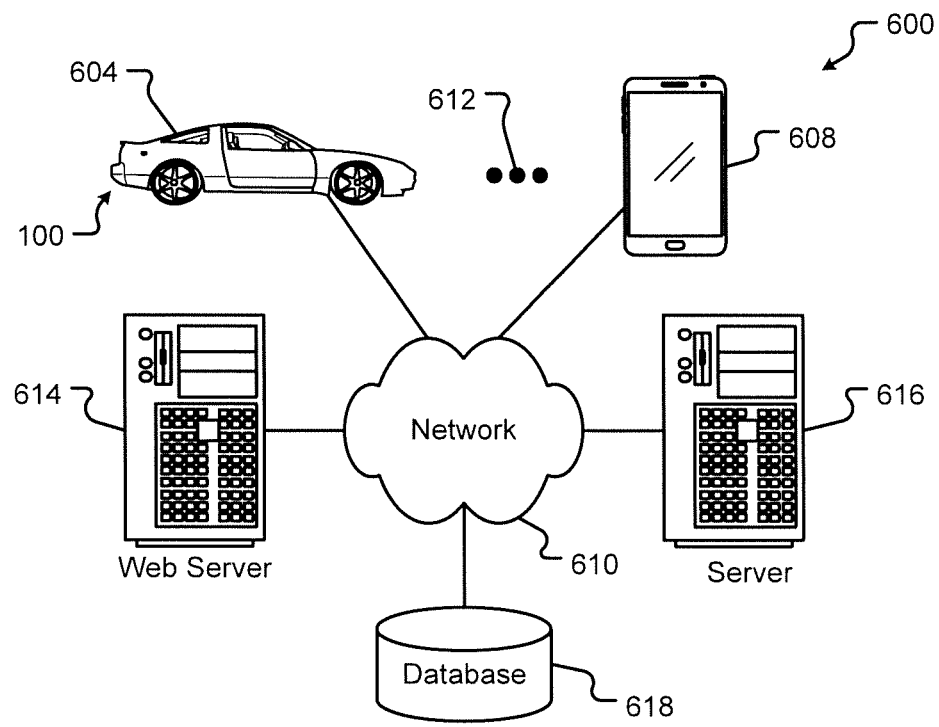
FIG. 6 is a block diagram of a computing environment associated with the embodiments presented herein.

FIG. 6 illustrates a block diagram of a computing environment 600 that may function as the servers, user computers, or other systems provided and described herein. The environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 610 and/or displaying and navigating web pages or other types of electronic documents. Although the exemplary computer environment 600 is shown with two computing devices, any number of user computers or computing devices may be supported.

Environment 600 further includes a network 610. The network 610 may can be any type of network familiar to those skilled in the art that can support data communications using any of a variety of commercially-available protocols, including without limitation SIP, TCP/IP, SNA, IPX, AppleTalk, and the like. Merely by way of example, the network 610 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java servers, and the like. In some instances, the web server 614 may publish operations available operations as one or more web services.

The environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-11.

The environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 610) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
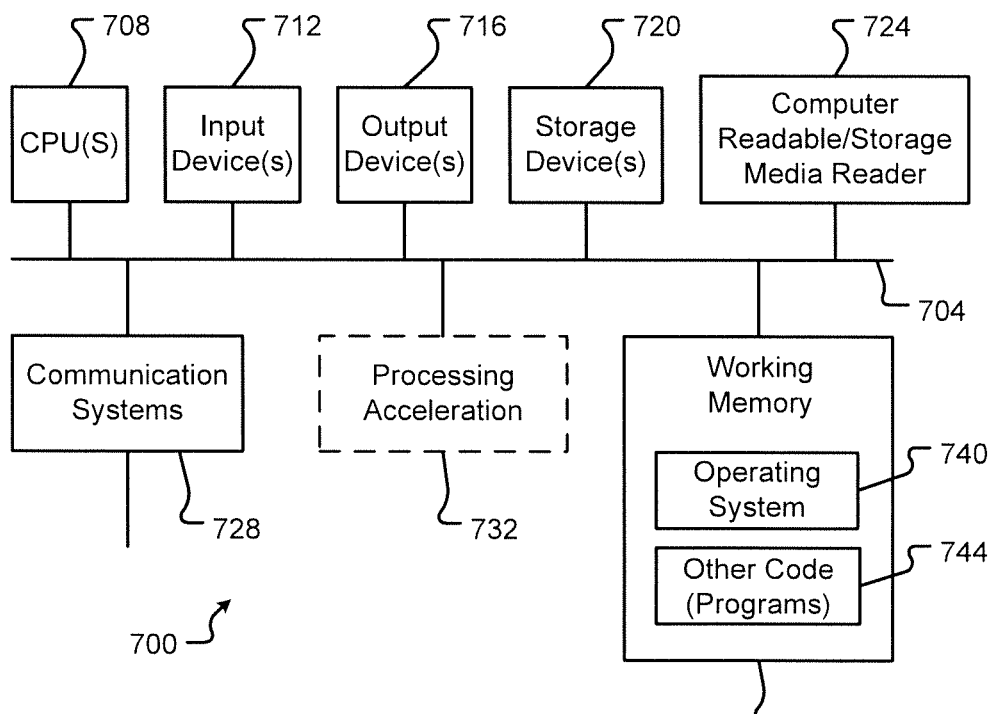
FIG. 7 is a block diagram of a computing environment associated with the embodiments presented herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 8:
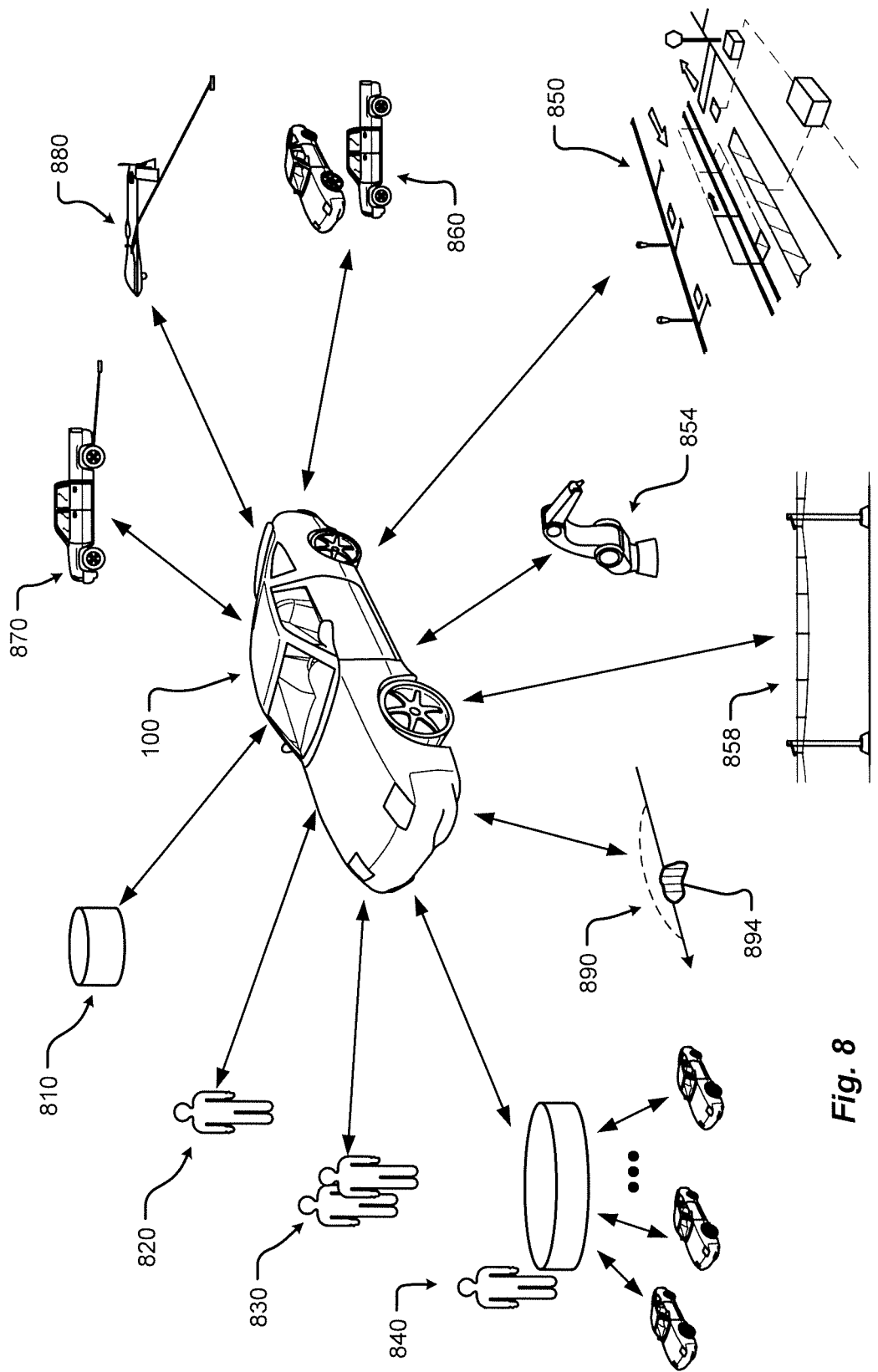
FIG. 8 is a diagram of operational and/or charging environments.

Referring to FIG. 8, the vehicle 100 is shown in a plurality of operational and/or charging environments. The vehicle 100 may operate in any one or more of the depicted environments in any combination. Other embodiments are possible but may not be depicted in FIG. 8. Generally, the vehicle 100 may operate in environments which enable charging of the vehicle 100 and/or operation of the vehicle 100. More specifically, the vehicle 100 may receive a charge via one or more means comprising emergency charging vehicle system 870, aerial vehicle charging system 880, roadway system 850, robotic charging system 854, and/or overhead charging system 858. The vehicle 100 may interact and/or operate in an environment comprising one or more other roadway vehicles 860. The vehicle 100 may engage with elements within the vehicle 100 comprising vehicle driver 820, vehicle passengers 830, and/or a vehicle database 810. In one embodiment, vehicle database 810 may not physically reside in the vehicle 100 and may instead be accessed remotely (e.g., by wireless communication, etc.), and as such, may reside in another location such as a residence or business location. The vehicle 100 may operate autonomously and/or semi-autonomously in an autonomous environment 890 (here, depicted as a roadway environment presenting a roadway obstacle 894 of which the vehicle 100 autonomously identifies and steers the vehicle 100 clear of the obstacle 894). Furthermore, the vehicle 100 may engage with a remote operator system 840, which may provide fleet management instructions or control.

In some embodiments, the vehicle 100 may be configured to receive charge via one or more compatible vehicle charging interfaces, such as one or more charging panels and/or interconnections. These compatible vehicle charging interfaces may be configured at one or more locations on, in, or about a vehicle 100. For instance, the locations may include locations on the vehicle 100 wherein charging may be received, via a vehicle roof 130, vehicle side 160 and vehicle lower or undercarriage 140.

Figure 9:
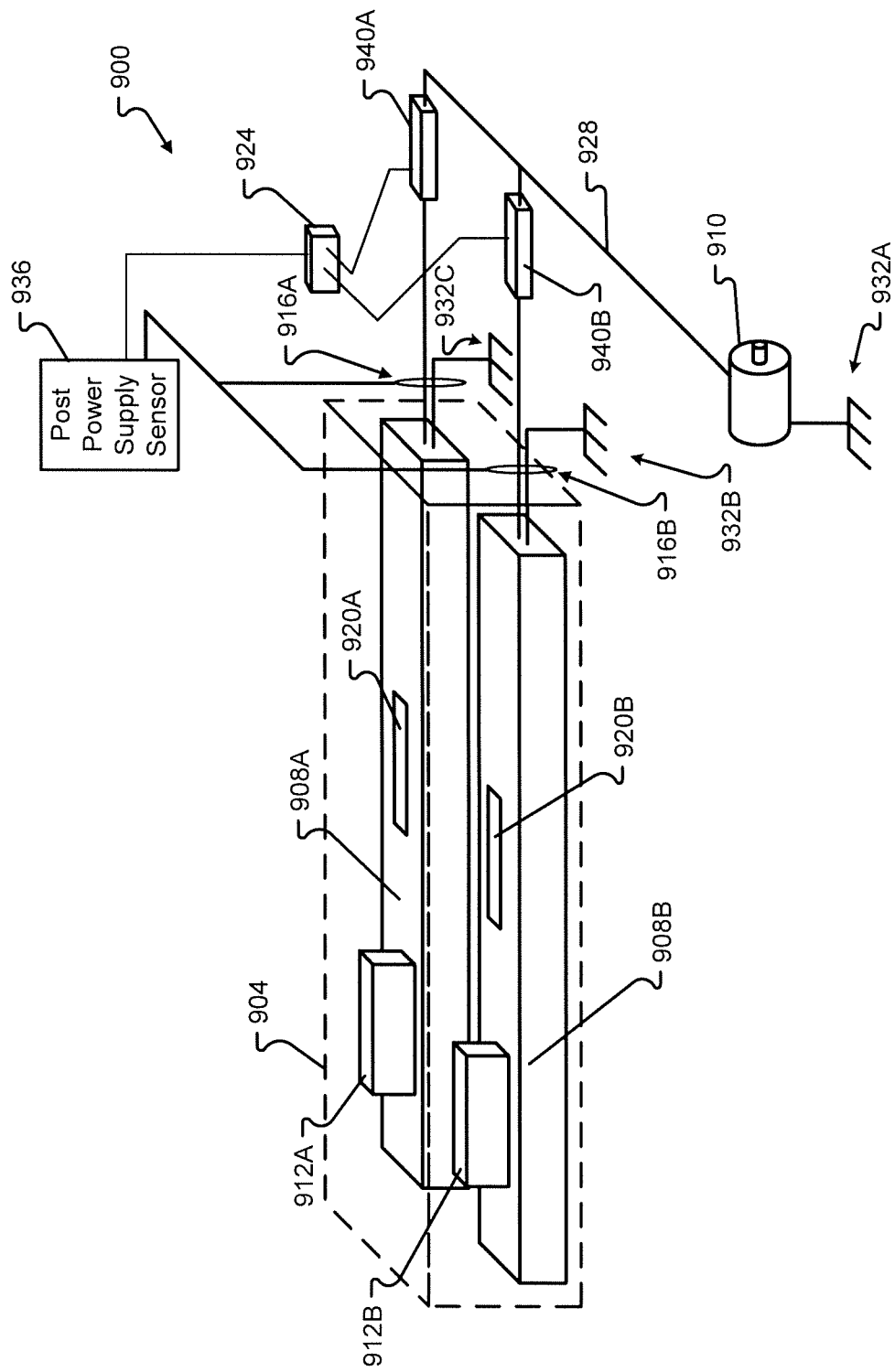
FIG. 9 depicts an electrical system in accordance with embodiments of the present disclosure.

FIG. 9 shows one embodiment of electrical system 900 of the vehicle 100. The electrical system 900 can include power source(s) 208 that generate power, power storage that stores power, and/or load(s) 400 that consume power. Power storage unit 904 supplies stored power to power load 910 via power bus 928. Power bus 928 may include chassis ground 932A-C or other wiring to provide a complete circuit between load 910, comprising at least one of load 400, and each of batteries 908A-B.

Autonomous vehicles generally require redundancy while in the nascent development, or infancy, stage. If a conventional battery of a vehicle were to fail while driving during human operation, logical actions taken by the human driver would allow the vehicle to be controlled to a safe stop. However, if this failure occurs when the vehicle is operating in fully autonomous drive (e.g., without human operator input or guidance, etc.), there is no guarantee that the vehicle could perform or provide safe control.

It is an aspect of the present disclosure to provide a new way of adding redundancy to the system to avoid this unsafe type of scenario. For example, multiple battery strings may be added in parallel for redundancy making a safer autonomous vehicle 100. In the event of a single point failure in a battery string (e.g., 908A or 908B), and/or where the "driver" may be sleeping or otherwise not paying attention while the vehicle is operating in autonomous mode, the vehicle 100 may disable the battery string with the failure and seamlessly continue operating until it reaches a safe state. Additionally or alternatively, the system 900 may not just include two or more redundant batteries 908A-B but may also include two or more redundant sets of control electronics. The multiple redundant sets of control electronics allow for a failure in one set without affecting the operational ability of the system 900 or vehicle 100. In one embodiment, the two or more battery systems may be managed and synchronized by a supervisory master battery management system. The battery string may correspond to one or more of the battery 908A-B, the control unit 912A-B, and/or the sensor 920A-B associated with a particular half of the power storage unit 904. For instance, the first battery string may include the battery 904A, the control unit 912A, and/or the sensor 920A, while the second battery string may include the battery 904B, the control unit 912B, and/or the sensor 920B.

In some embodiments, the present disclosure provides a power storage unit 904, or battery system, comprising two equal and symmetric halves, each half having its own control scheme and connection to the body. Among other things, this arrangement allows one side of the unit 904 (e.g. one of the batteries 908A-B, control units 912A-B, etc.) to fail while still operating on the other side (e.g. the other of the batteries 908A-B, control units 912A-B, etc.) of the power storage unit 904.

In one embodiment, the present system 900 may use multiple batteries 908A-B simultaneously, in parallel, during drive mode. Among other things, this approach has the advantages of providing an uninterrupted power supply in case of a battery 908A-B failure, and being able to deliver power from both batteries 908A-B at once for better vehicle performance (as opposed to only using a single battery, while the other is not used to provide power, etc.). Additionally or alternatively, the present disclosure provides a fully redundant drive-operational system for the batteries 908A-B. It is an aspect of the present disclosure that the load may be fully detached from the energy source.

Power storage unit 904 comprises a plurality of batteries 908A-B. Battery 908 may utilize a respective control unit 912 to monitor battery performance, managing charging, and/or other operations for battery 908 as a whole and/or individual cells or components therein. Sensor 920 monitors battery 908 for external anomalies, such as high-temperature state, arcing, or other fault. Post power supply sensor 936 may be provided to monitor the output detected by detectors 916. Main controller 924 receives data on the performance and/or state of each battery 908A-B from data sources, such as from one or more of post power supply sensor 936, sensors 920, and/or control units 912. It should be appreciated that alternative configurations of sensing and sensing data processing components (control units 912, sensors 920, post power supply sensor 936, and main controller 924) are contemplated, such as to combine any two or more sensing and sensing data processing components into a single component.

Batteries 908 supply power in parallel to load 910. Such a configuration enables each of batteries 908A-B to be available to supply power to load 910. However, batteries may fail or develop a fault. Main controller 924 may receive an input from control units 912, sensors 920, post power supply sensor 936, or other battery monitoring component indicating, for example, battery 908B has developed a fault.

Main controller 924 may access a model of batteries 908A-B from a repository, such as database 618, storage device(s) 720, and/or working memory 736. The modeling may be performed prior to installation of batteries 908A-B, such as by the manufacturer, or once installed, such as by CPU(s) 708. The operation of load 932 and/or charging of batteries 908A-B will cause various attributes of each of batteries 908A-B to change. A fault may be detected when such an attribute falls outside an acceptable value or range of values for a particular attribute.

A battery model may comprise a state of charge (SOC), state of health (SOH), low temperature, low voltage, high temperature, high voltage, under current, over current, and/or additional attributes or combinations thereof. SOH reflects a general condition of a battery in its current state as compared to when the battery is new. Charge acceptance, internal resistance, voltage and/or self-discharge may be utilized as SOH models or model attributes.

A particular battery being drained, charged, or cycling between both draining and charging, will have an acceptable attribute value(s) as determined by the model. A battery model may be applied to each of batteries 908A-B, such as when batteries 908 are, or are manufactured with the intent to be, identical. A plurality of battery models, a distinct one for each of batteries 908A-B, may be utilized, such as when batteries 908 are non-identical or to provide a single battery-model relationship, such as to allow the future implementation of dissimilar batteries without requiring modification of a single model utilized when only one battery is replaced. The performance of each of batteries 908A-B may be determined against the model via a single processing device, such as main controller 924 or a dedicated processing device for each battery 908A-B, such as may provide a signal of a determined fault(s) to main controller 924.

Once a fault in one battery, such as battery 908A, is detected, battery 908A is isolated via corresponding switch 940B. Power then being available to load 910 via battery 908B. However, battery 908B may also have a fault. Main controller 924 then executes a decision to determine what cause of action to take. If, for example, load 910 is providing locomotion and control to vehicle 100, the particular circumstance of vehicle 100 may determine the cause of action. If no risk to persons or property is evident, main controller 924 may isolate both batteries 908A-B, whereby vehicle 100 is disabled.

Vehicle 100 may be in a particular circumstance that disabling all batteries 908 may be unsafe to an occupant of vehicle 100; pedestrians, other motorists, or property; vehicle 100 itself; and/or components of vehicle 100, which may include, among other things, batteries 908. For example, vehicle 100 may be located in a busy motorway and be at risk for being hit by other vehicles. Accordingly, main controller 924 may keep one or more faulty batteries 908 online until vehicle 100 may be safely shut down without posing a risk to persons and property. In another example, vehicle 100 may be located in a remote location whereby faulty batteries 908 are keep online until vehicle 100 has traveled to a location whereby vehicle 100 and/or occupants of vehicle 100 may be safely deposited.

Main controller 924 may delay isolating one or both of batteries 908A-B following a "lesser of two evils" approach. If one battery, such as 908A, has a minor fault and another battery, such as 908B, has a significant fault, the lessor fault (e.g., lessor risk of additional and/or subsequent damage to the battery, vehicle, occupant of the vehicle, other persons or property, etc.) may be temporarily ignored until such time as vehicle 100 may be safely disabled by isolating both failed batteries 908A-B. In another embodiment, one battery, such as battery 908A, may develop a fault and be isolated. Accordingly, a particular one of batteries 908 may have isolation delayed, even if such a connection may result in permanent or subsequent (e.g., fire) damage when immediate isolation poses a larger risk (e.g., collision with another vehicle, loss of control, etc.). A subsequent fault, determined to be more serious, in battery 908B may require reconnecting battery 908A prior to isolating. Accordingly, vehicle 100 is provided with power without interruption (blackout) or current drop (brownout) prior to a subsequent, but more serious, fault encountered that necessitates reconnection of a previously isolated one of batteries 908 before the other of batteries 908 is isolated.

In response to a detected or determined fault, main controller 924 then signals the respective switch 940, in this example, switch 940B to electrically isolate battery 908B. Load 910 may then continue to operate with uninterrupted power as supplied by the remaining battery, in this example, battery 908A. The uninterrupted power is maintained to provide load 910 with power absent any blackouts our brownouts. Switch 940 is a device that, with an input signal, allows a circuit (different from the input signal) to be selectively opened or closed. Switch 940 may be embodied as a relay, whereby the input is an electrical signal, such as from main controller 924 determining a fault and causing one or both terminals of battery 208 to be selectively connected or disconnected. Switch 940 may be implemented with a mechanical input, such as by a servo, actuator, motor, or other component of, or in conjunction with, main controller 924, to supply the mechanical force.

Main controller 924 may signal an operator of load 910, such as by providing a text, audible, and/or other message or alert, such as on display 320, indicating the battery fault and/or information on actions that should be taken or operational limitations that may have resulted from the failed battery (e.g., "Service battery 2 soon," "Vehicle range now limited to X miles," "Emergency! Stop vehicle immediately!"). Additionally, or alternatively, main controller 924 may notify other components, such as communications subsystem 600 or components therein (see FIG. 6) to take action as determined appropriate for the fault (e.g., schedule service, place order for a replacement battery, notify emergency personnel of a dangerous or emergency state of the battery and/or vehicle, notify roadside assistance that the vehicle will be unable to reach a charging station, etc.).

Switches 940 may operate in a closed state as a default and, unless acted upon, allow load 910 and batteries 908 to be electrically connected. In another embodiment, switch 940 may operate in an open state as a default. Should switch 940 not receive a signal from main controller 924, such as due to communication pathway being severed (e.g., due to a collision or impalement or failure) or due to a failure of main controller 924, switch 940 may open the circuit and isolate batteries 908.

It should be appreciated that, in addition to switches 940, other intervening components, such as mechanical connectors, rheostats, inductors, potentiometers, and/or other devices may be utilized to control or switch power provided by batteries 908 to load 910 may be implemented. One or both of switch 940A-B may be implemented to isolate a single terminal of their respective battery 908A-B, such as when a non-switched terminal is at the same electrical potential as the chassis or ground. In another embodiment, one or both of switch 940A-B may be implemented to isolate both terminals of their respective battery 908A-B to entirely electrically isolate a battery. Load 910 may comprise a plurality of loads. For example, load 910 may comprise a locomotion motor to propel vehicle 100 as well as computing components (e.g., CPU 708, input devices 712, output devices 716, etc.) utilized to control vehicle 100. By isolating a faulty battery, and not isolating a non-faulty battery, load 910 continues to receive power from the non-faulty battery, which may enable vehicle 100 to remain drivable, and controllable, for a period of time. In another embodiment, load 910 may operate as a power source (e.g., energy recovery system 236), when isolated, battery 908 would be inoperable to receive power from load 910 or other power source (e.g., generator, plug-in connection, etc.).

Many battery faults may be mitigated by electrically isolating the faulty battery. In other embodiments, the fault may be with an associated component of the battery and draining the associated battery results in improved safety and/or utility. For example, sensor 920A may be a piezoelectric, spring switch, or other mechanism by which battery 908A may be determined to be property restrained. Should battery 908A become loose, an operator may be signaled via a message on display 300. However, if not restrained, draining the unrestrained battery 908A first, and isolating restrained battery 908B, may be performed to improve safety as an uncaged dead (or lower charge) battery is likely to result in a safer state of vehicle 100 or components or occupants thereof, as compared to an uncaged charged (or greater charge) battery.

In another embodiment, sensor 920 may comprise an internal pressure sensor, such as when batteries 908 are sealed. Sensor 920 may also be embodied as a fine wire conductor, which may be affixed internally or externally to battery 908. In such an embodiment, fine wire may be broken should battery 908 be bent, flex, twisted, or otherwise physically deformed—such as may occur with a collision or impact with road debris. CPU 708 may cause a continuous or periodic determination of continuity of the fine wire and, if non-existent, indicate that battery 908 has been deformed and poses a risk for subsequent damage (e.g., internal shorting, leaking electrolyte, etc.). The fine wires may be encased in a brittle sheathing (e.g., glass) such that bending causes the sheathing to break, and with it the wire, thereby causing continuity of a circuit comprising the wire to be interrupted. In another embodiment, mirrors may be placed on and/or in battery 908 or a harness containing battery 908 and, should battery 908 be deformed, the mirrors would be cause light from a light source to move and either be detected in accordance with battery 908 being deformed (e.g., the reflected light now hits a photo sensing target) or the absence of detection, in accordance with batter 908 not being deformed (e.g., the reflected light now misses a photo sensing target).

Sensor 920 may be an accelerometer to monitor battery 908 for physical shock, vibration, or other acceleration that may indicate battery 908 may have been subject to damage. Any sensed fault of battery 908 may be processed by CPU 708 and optionally communicated to an operator and/or safety personnel or roadside assistance via communication subsystem 500. CPU 708 may then indicate the best course of action (e.g., schedule service, execute emergency procedure, eject/remove the battery, etc.) and signal systems and/or personnel accordingly.

Sensor 920 may indicate a fault that is transient. For example, sensor 920A may detect a temperature spike in battery 908A. Accordingly, main controller 924 may cause switch 940A to isolate battery 908A. A subsequent observation by sensor 920A may indicate that battery 908A has sufficiently cooled and cause witch 940A to close the circuit and thereby reconnect battery 908A to load 910. It is also contemplated that main controller 924 may be overridden, such as when isolating a battery, even if faulty, may place vehicle 100 in an unduly hazardous situation. Accordingly, a user and/or system input may cause main controller 924 to reconnect an isolated one of battery 908A-B or prevent the isolation of one of battery 908A-B.

Figure 10:
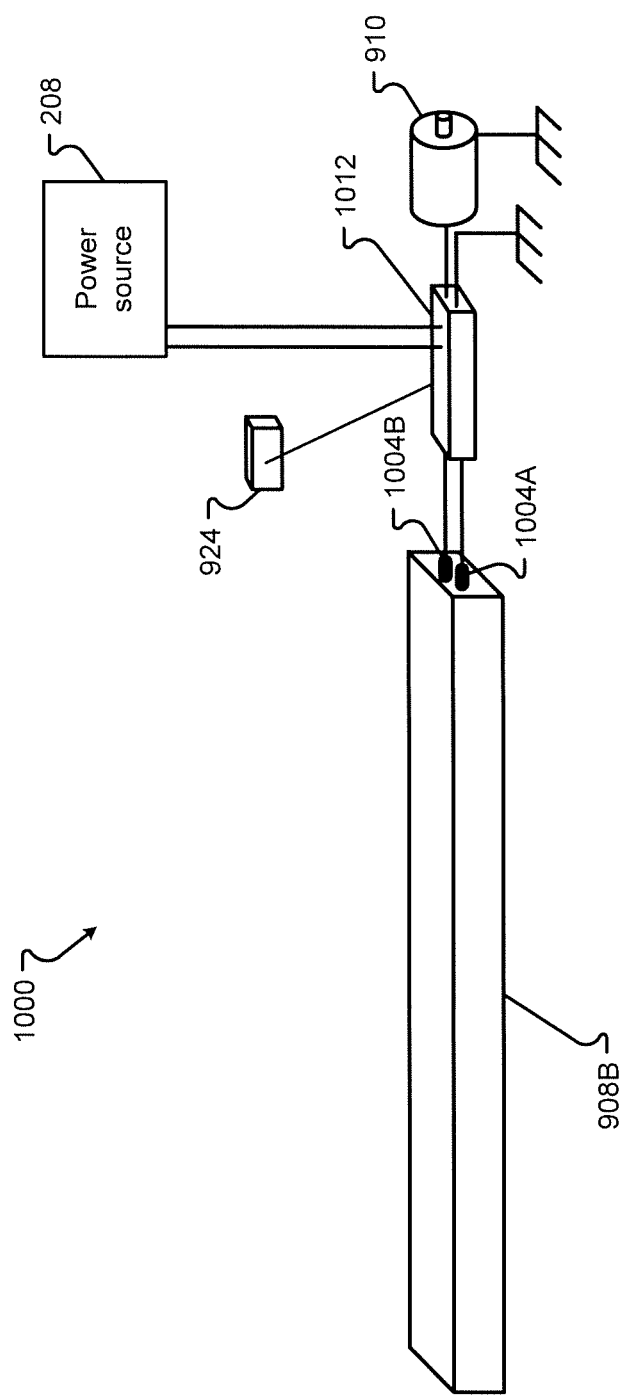
FIG. 10 depicts additional details of a power isolation method in accordance with embodiments of the present disclosure.

FIG. 10 shows one embodiment of electrical system 1000 of the vehicle 100. The electrical system 1000 illustrates one of batteries 908 (for clarity), in battery 908B. Battery 908B comprises terminals 1004A-B, connected to switch 1012. Switch 1012 selectively opens and closes both of a positive terminal (one of terminals 1004A-B having a positive charge) and a negative terminal (one of terminals 1004A-B having a negative charge). Generally, a negative charge portion may utilize a chassis ground or a dedicated wire/bus for a ground, however, a positive grounded system is also contemplated.

Main controller 924 may selectively cause switch 1012 may isolate battery 908A from power source 208 and/or load 910. For example, a fault may be detected by sensor 920B (see FIG. 9) indicating an overcharged state of battery 908B. Accordingly, main controller 924 may cause switch 924 to isolate battery 908B from power source 208, and thereby prevent additional charging, but not isolate battery 908B from load 910, allowing the charge held by battery 908B to discharge.

Figure 11:
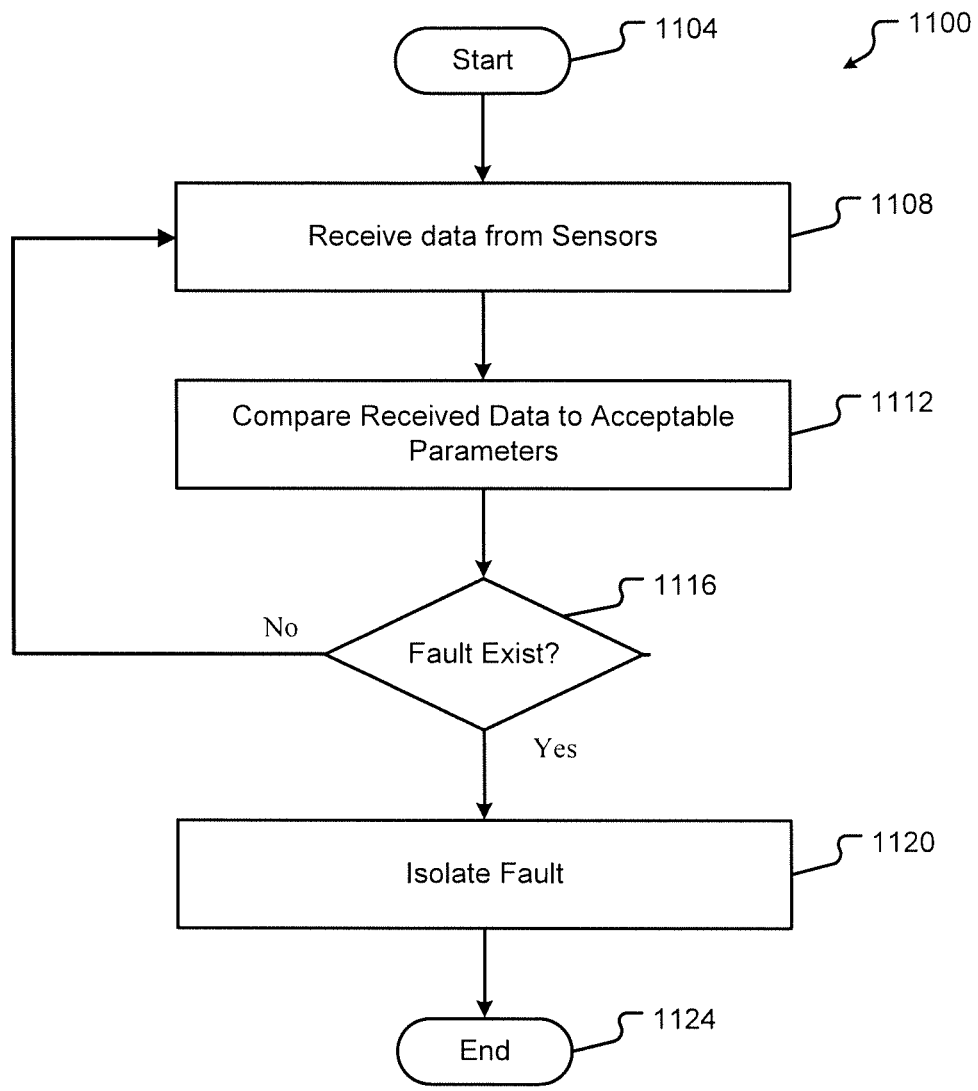
FIG. 11 illustrates a flow chart in accordance with embodiments of the present disclosure.

FIG. 11 shows flow chart 1100 of processor executable instructions according to an embodiment. Flow chart 1100 starts at step 1104. Next, in step 1108, data is received by sensors. For example, one or more sensors 920 monitoring two or more batteries 908 and determining a data value in accordance with a sensed attribute of ones of the batteries 908. The data may then be reported to main controller 924, CPU 708, or other processor or processor containing component.

Next, step 1112 compares the received data to an acceptable parameter, such as may be maintained in computer-readable memory, such as working memory 736, database 618, and/or other location. Next, step 1116 determines if a fault exists, such as by determining the received data is different from, or outside of an acceptable range, of a value for the acceptable parameter. If step 1116 is determined in the negative, processing may loop back to step 1108. If step 1116 is determined in the affirmative, processing continues to step 1120.

Step 1120 isolates the fault, such by causing switch 940 to electrically isolate a fault with respect to a particular battery 908 but otherwise allow non-fault batteries 908 to continue to provide power to load 910. Step 1120 may isolate a single portion of a circuit (e.g., the positive-connected portion of a battery 908 to be isolated) or both the positive and negative portions of the circuit. At step 1124, flow chart 1100 may stop. In other embodiments, processing continues back to step 1108, such as to determine if the fault is transient and, if so, optionally reconnecting the previously isolated battery 908 in step 1120.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a system comprising: a first battery; a second battery; a first battery sensor, the first battery sensor monitors an attribute of the first battery and outputs a first sensor data determined by the sensed attribute of the first battery; a first battery switch, the first battery switch receives a first control signal and, in response thereto, selectively opens or closes an electrical circuit comprising the first battery and a load; a main controller; and wherein the first battery and the second battery are arranged in an electrically parallel configuration to supply power to the load; and the main controller, upon determining the first sensor data indicates a fault with the first battery, provides the control signal to the first battery switch to isolate the first battery from the load.

Embodiments also include a method, comprising: monitoring a first attribute of a first battery configured to provide power, in parallel with a second battery, to a load; determining whether the first attribute indicates a fault; and upon determining the attribute indicates a fault, causing the first battery to be electrically isolated from the load.

Embodiments also include an autonomous vehicle, comprising: a motor to provide locomotion to the vehicle; a computer to operate the vehicle; a first battery and a second battery connected in an electrically parallel configuration and providing power to the motor and the computer; a sensor to monitor an attribute of the first battery; a switch to selectively electrically isolate the first battery from the motor and the computer; and a main controller, the main controller receiving from the sensor data representing the attribute of the first battery and, upon determining the attribute indicates a fault, signals the switch to electrically isolate the first battery from both the motor and the computer.

Aspects of the above system include: a second battery sensor, the second battery sensor monitors an attribute of the second battery and outputs a second sensor data determined by the sensed attribute of the second battery; a second battery switch, the second battery switch receives a second control signal and, in response thereto, selectively opens or closes an electrical circuit comprising the second battery and the load; and the main controller, upon determining the second sensor data indicates a fault with the second battery, provides the control signal to the second battery switch to isolate the second battery from the load.

Aspects of the above system also include: wherein the first battery switch selectively opens or closes the electrical circuit comprising selectively opening or closing both of a positive charge portion of the circuit, electrically connected to a positive terminal of the first battery, and a negative charge portion of the circuit, electrically connected to a negative terminal of the first battery. Aspects of the above system also include: wherein the switch comprises a relay. Aspects of the above system also include: a first control unit, the first control unit monitors at least one cell of the first battery and outputs the first control signal. Aspects of the above system also include: wherein the first battery sensor monitors the attribute of the first battery, the attribute comprising one or more of voltage, temperature, current, isolation resistance, vibration, flex, detachment, internal pressure, and arcing. Aspects of the above system also include: wherein the main controller is physically isolated from the first battery. Aspects of the above system also include: wherein the first switch isolates the first battery in the absence of a signal from the main controller. Aspects of the above system also include: wherein the main controller further comprises a data output and, thereon, provides a data signal indicating the detected fault. Aspects of the above system also include: wherein the load comprises a motor, the motor configured to provide locomotion to a vehicle, and a computer, the computer providing operational signals for the operation of the vehicle. Aspects of the above system also include, providing a message to at least one of an operator of a device that comprises the first batter or a computing device indicating the fault. Aspects of the above system also include, determining the first attribute indicates the fault further comprises, accessing a stored value indicating an acceptable range for the first attribute and determining the first attribute indicates is outside of the acceptable range.

Aspects of the above method also include: wherein the first battery switch selectively opens or closes the electrical circuit comprising selectively opening or closing both of a positive charge portion of the circuit, electrically connected to a positive terminal of the first battery, and a negative charge portion of the circuit, electrically connected to a negative terminal of the first battery. Aspects of the above method also include: wherein the switch comprises a relay. Aspects of the above method also include: a first control unit, the first control unit monitors at least one cell of the first battery and outputs the first control signal. Aspects of the above method also include: wherein the first battery sensor monitors the attribute of the first battery, the attribute comprising one or more of voltage, temperature, current, isolation resistance, vibration, flex, detachment, internal pressure, and arcing. Aspects of the above method also include: wherein the main controller is physically isolated from the first battery. Aspects of the above method also include: wherein the first switch isolates the first battery in the absence of a signal from the main controller. Aspects of the above method also include: wherein the main controller further comprises a data output and, thereon, provides a data signal indicating the detected fault. Aspects of the above method also include: wherein the load comprises a motor, the motor configured to provide locomotion to a vehicle, and a computer, the computer providing operational signals for the operation of the vehicle. Aspects of the above method also include, providing a message to at least one of an operator of a device that comprises the first batter or a computing device indicating the fault. Aspects of the above method also include, determining the first attribute indicates the fault further comprises, accessing a stored value indicating an acceptable range for the first attribute and determining the first attribute indicates is outside of the acceptable range.

Aspects of the autonomous vehicle also include: wherein the first battery switch selectively opens or closes the electrical circuit comprising selectively opening or closing both of a positive charge portion of the circuit, electrically connected to a positive terminal of the first battery, and a negative charge portion of the circuit, electrically connected to a negative terminal of the first battery. Aspects of the above autonomous vehicle also include: wherein the switch comprises a relay. Aspects of the above autonomous vehicle also include: a first control unit, the first control unit monitors at least one cell of the first battery and outputs the first control signal. Aspects of the above autonomous vehicle also include: wherein the first battery sensor monitors the attribute of the first battery, the attribute comprising one or more of voltage, temperature, current, isolation resistance, vibration, flex, detachment, internal pressure, and arcing. Aspects of the above autonomous vehicle also include: wherein the main controller is physically isolated from the first battery. Aspects of the above autonomous vehicle also include: wherein the first switch isolates the first battery in the absence of a signal from the main controller. Aspects of the above autonomous vehicle also include: wherein the main controller further comprises a data output and, thereon, provides a data signal indicating the detected fault. Aspects of the above autonomous vehicle also include: wherein the load comprises a motor, the motor configured to provide locomotion to a vehicle, and a computer, the computer providing operational signals for the operation of the vehicle. Aspects of the above autonomous vehicle also include, providing a message to at least one of an operator of a device that comprises the first batter or a computing device indicating the fault. Aspects of the above autonomous vehicle also include, determining the first attribute indicates the fault further comprises, accessing a stored value indicating an acceptable range for the first attribute and determining the first attribute indicates is outside of the acceptable range.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A system, comprising:
   a first battery;
   a second battery;
   a first battery sensor, the first battery sensor monitors an attribute of the first battery and outputs a first sensor data determined by a sensed attribute of the first battery;
   a first battery switch, the first battery switch receives a first control signal and, in response thereto, selectively opens or closes an electrical circuit comprising the first battery and a load;
   a main controller; and
   wherein the first battery and the second battery are arranged in an electrically parallel configuration to supply power to the load; and
   the main controller, upon determining that the first sensor data indicates a fault with the first battery, provides the first control signal to the first battery switch to isolate the first battery from the load while maintaining uninterrupted power to the load with the second battery during a period of time in which the first battery switch is switched to isolate the first battery from the load.

2. The system of claim 1, further comprising:
   a second battery sensor, the second battery sensor monitors an attribute of the second battery and outputs a second sensor data determined by the sensed attribute of the second battery;
   a second battery switch, the second battery switch receives a second control signal and, in response thereto, selectively opens or closes an electrical circuit comprising the second battery and the load; and
   the main controller, upon determining the second sensor data indicates a fault with the second battery, provides the second control signal to the second battery switch to isolate the second battery from the load.

3. The system of claim 1, wherein the first battery switch selectively opens or closes the electrical circuit comprising selectively opening or closing both of a positive charge portion of the electrical circuit, electrically connected to a positive terminal of the first battery, and a negative charge portion of the electrical circuit, electrically connected to a negative terminal of the first battery.

4. The system of claim 1, wherein the first battery switch comprises a relay.

5. The system of claim 1, further comprising a first control unit, the first control unit monitors at least one cell of the first battery and causes the main controller to output the first control signal.

6. The system of claim 1, wherein the attribute of the first battery comprises one or more of voltage, temperature, current, isolation resistance, vibration, flex, detachment, internal pressure, and arcing.

7. The system of claim 1, wherein the main controller is physically isolated from the first battery.

8. The system of claim 1, wherein the first battery switch isolates the first battery in an absence of a signal from the main controller.

9. The system of claim 1, wherein the main controller further comprises a data output and, thereon, provides a data signal indicating the indicated fault.

10. The system of claim 1, wherein the load comprises a motor, the motor configured to provide locomotion to a vehicle, and a computer, the computer providing operational signals for operation of the vehicle.

11. A system, comprising:
a first battery;
a second battery, wherein the first battery and the second battery are arranged in an electrically parallel configuration to supply power to a load;
a first battery sensor that monitors a first attribute of the first battery and outputs first sensor data determined by a sensed first attribute of the first battery;
a second battery sensor that monitors a second attribute of the second battery and outputs second sensor data determined by a sensed second attribute of the second battery,
a first battery switch that receives a first control signal and, in response thereto, selectively opens or closes a first electrical circuit comprising the first battery and the load;
a second battery switch that receives a second control signal and, in response thereto, selectively opens or closes a second electrical circuit comprising the second battery and the load; and
a main controller to, upon determining that the first sensor data indicates a fault with the first battery, provide the first control signal to the first battery switch to isolate the first battery from the load while maintaining interrupted power to the load with the second battery during a period of time in which the first battery switch is switched to isolate the first battery from the load, and to, upon determining that the second sensor data indicates a fault with the second battery, provide the second control signal to the second battery switch to isolate the second battery from the load while maintaining uninterrupted power to the load with the first battery during a period of time in which the second battery switch is switched to isolate the second battery from the load.

12. The system of claim 11, further comprising:
a first control unit that monitors a third attribute of the first battery; and
a second control unit that monitors a fourth attribute of the second battery.

13. The system of claim 12, wherein the third attribute is a different type of attribute than the first attribute, and wherein the fourth attribute is a different type of attribute than the second attribute.

14. The system of claim 12, wherein the third attribute is an internal attribute of the first battery, and wherein the fourth attribute is an internal attribute of the second battery.

15. The system of claim 14, wherein the third attribute and the fourth attribute are a same type of attribute.

16. The system of claim 14, wherein the first attribute is an external attribute of the first battery, and wherein the second attribute is an external attribute of the second battery.

17. The system of claim 14, wherein the third attribute is an attribute of at least one cell of the first battery, and the fourth attribute is an attribute of at least one cell of the second battery.

18. The system of claim 12, wherein the first control unit manages charging for the first battery, and wherein the second control unit manages charging for the second battery.

19. The system of claim 11, wherein the fault of the first battery is a failure of the first battery, and wherein the fault of the second battery is a failure of the second battery.

20. The system of claim 11, wherein the first attribute and the second attribute are a same type of attribute of the first and second batteries.

* * * * *

UNITED STATES PATENT AND TRADEMARK OFFICE
CERTIFICATE OF CORRECTION

PATENT NO. : 10,981,468 B2
APPLICATION NO. : 15/701034
DATED : April 20, 2021
INVENTOR(S) : Austin L. Newman et al.

It is certified that error appears in the above-identified patent and that said Letters Patent is hereby corrected as shown below:

In the Specification

At Column 20, Line 13, after "switch" delete "924" and insert therein --1012--.

Signed and Sealed this
Second Day of January, 2024

Katherine Kelly Vidal
*Director of the United States Patent and Trademark Office*